(12) United States Patent
Sato et al.

(10) Patent No.: US 8,105,542 B2
(45) Date of Patent: Jan. 31, 2012

(54) ENGINE EXHAUST GAS PURIFIER

(75) Inventors: Shinya Sato, Tokyo (JP); Mitsuru Hosoya, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 763 days.

(21) Appl. No.: 11/765,259

(22) Filed: Jun. 19, 2007

(65) Prior Publication Data

US 2008/0317645 A1    Dec. 25, 2008

(51) Int. Cl.
*B01D 50/00* (2006.01)
(52) U.S. Cl. .................................................. 422/170
(58) Field of Classification Search .................. 422/168, 422/177, 180
See application file for complete search history.

(56) References Cited

U.S. PATENT DOCUMENTS

| 6,753,294 B1 * | 6/2004 | Brisley et al. ................ 502/439 |
| 6,892,529 B2 * | 5/2005 | Duvinage et al. ............. 60/286 |

FOREIGN PATENT DOCUMENTS

| JP | 53-122671 | 10/1978 |
| JP | 08-103636 | 4/1996 |
| JP | 2002-250220 | 9/2002 |
| JP | 2004-060494 | 2/2004 |
| JP | 2004-162600 A | 6/2004 |
| JP | 2004-239109 A | 8/2004 |
| JP | 2004-270520 A | 9/2004 |
| JP | 2004-346794 | 12/2004 |
| JP | 2007-501353 A | 1/2007 |

OTHER PUBLICATIONS

Office Action dated Aug. 17, 2010, issued in Japanese Patent Appln. S.N. 2005-147492, and English translation thereof.

* cited by examiner

*Primary Examiner* — Tom Duong
(74) *Attorney, Agent, or Firm* — Kubovcik & Kubovcik

(57) ABSTRACT

A selective reduction catalyst includes a catalyst support in which a plurality of through holes partitioned by porous walls are formed in parallel with each other and an active component having a catalytic action and carried by the walls. Inlet portions and outlet portions, adjacent to each other, of the through holes are alternately sealed, and the wall carrying the active component is formed so that a particle-state solid matter ammonium nitrate cannot pass through it. The exhaust gas purifier includes the selective reduction catalyst, a liquid injection nozzle which is provided on the upstream side and can inject urea liquid toward the catalyst, a diesel particulate filter provided at an exhaust pipe on the upstream side, and filter temperature raising means capable of raising the temperature of the diesel particulate filter to a predetermined value or above.

1 Claim, 2 Drawing Sheets

ENGINE EXHAUST GAS PURIFIER

BACKGROUND OF THE INVENTION

1. Field of the Invention

The present invention relates to a selective reduction catalyst that dissolves nitrogen oxide contained in an exhaust gas from a diesel engine by the reaction of nitrogen oxide with urea liquid and to an engine exhaust gas purifier for an engine using it.

2. Description of the Related Art

As an exhaust gas purifier for reducing nitrogen oxide (hereinafter, referred to as "NOx") contained in an exhaust gas from a diesel engine, there have been known an exhaust gas purifier, wherein a selective reduction catalyst is provided in the middle of an exhaust passage of a diesel engine, and a liquid injection nozzle which can inject urea liquid toward the selective reduction catalyst is provided at an exhaust pipe on the upstream side of the selective reduction catalyst (See Patent Document 1, for example). The conventional selective reduction catalyst comprises a catalyst support having through holes formed in plural in parallel with each other and an active component having a catalytic action and carried by partition walls of the catalyst support. And in the conventional diesel-engine exhaust gas purifier provided with this selective reduction catalyst, the urea liquid injected from the liquid injection nozzle is heated by heat of the exhaust gas and hydrolyzed, and ammonia is generated. And the ammonia serves as a reducing agent for purifying NOx in the exhaust gas by the selective reduction catalyst so that the NOx emitted to the atmosphere can be reduced.

Patent Document 1

Japanese Unexamined Patent Application Publication No. 2004-239109 (paragraph Nos. [0012] to [0015], FIGS. 2 to 4)

SUMMARY OF THE INVENTION

However, there remain problems that when a temperature in the selective reduction catalyst is relatively low approximately at 80 to 200° C., dissolution of NOx by the selective reduction catalyst is not effectively carried out, and even if the selective reduction catalyst is provided, NOx which is not dissolved at a low temperature is emitted into the atmosphere as it is.

The present invention has an object to provide a selective reduction catalyst which can effectively prevent NOx from being emitted into the atmosphere even if the temperature in the selection catalyst is relatively low; and an engine exhaust gas purifier using it.

An invention according to a first embodiment is, as shown in FIG. 2, an improvement of a selective reduction catalyst comprising a catalyst support 26 in which a plurality of through holes 26b partitioned by porous walls 26a are formed in parallel with each other and an active component having a catalytic action and carried by the wall 26a, in which nitrogen oxide in an exhaust gas from an engine 11 is dissolved by the reaction with urea liquid.

The characteristic construction lies in that an inlet portion 26c and an outlet portion 26d, adjacent to each other, of the plurality of through holes 26b partitioned by the walls 26a, are sealed alternately, the wall 26a carrying the active component has ventilation, and is formed so that the exhaust gas flowing in the inlet portion 26c of a through hole 26b passes through the wall 26a and is emitted from the outlet portion 26d of another thorough hole 26b adjacent to the a through hole 26b, and the wall 26a carrying the active component is also formed so that ammonium nitrate in a particle-state solid matter cannot pass through the wall 26a.

When the temperature of the exhaust gas is relatively low, it is known that NOx in the exhaust gas reacts with ammonia, and ammonium nitrate is generated, and ammonium nitrate turns into a particle-state solid matter at a temperature lower than the melting point of 210° C.

Therefore, with the selective reduction catalyst described in the first embodiment, ammonium nitrate generated when the temperature of the exhaust gas is relative low can be caught by its deposition on the wall 26a of the catalyst support 26, so that emission of the NOx into the atmosphere as it is can be effectively prevented even if the temperature of the exhaust gas is relatively low.

An invention according to a second embodiment is an exhaust gas purifier comprising, as shown in FIG. 1, a selective reduction catalyst 24 provided at an exhaust pipe 16 of the diesel engine 11 as described in the first embodiment, a liquid injection nozzle 29 which is provided at the exhaust pipe 16 on the exhaust-gas upstream side of the selective reduction catalyst 24 and can inject urea liquid 32 toward the selective reduction catalyst 24, a diesel particulate filter 51 provided at the exhaust pipe 16 on the exhaust-gas upstream side of the selective reduction catalyst 24, and a filter temperature raising means configured capable of raising the temperature of the diesel particulate filter 51 to a predetermined value or above.

In the engine exhaust gas purifier described in the second embodiment, particulates in an exhaust gas of the diesel engine 11 are caught by the particulate filter 51, and emission of the particulates to the outside can be effectively prevented. Also, when the urea liquid is injected from the liquid injection nozzle, the urea liquid is hydrolyzed and ammonia is generated, and when the exhaust gas temperature is relatively high, the ammonia serves as a reducing agent for purifying NOx in the exhaust gas by the selective reduction catalyst and can reduce the amount of NOx to be emitted into the atmosphere. On the other hand, when the exhaust gas temperature is relatively low, ammonium nitrate in the particle-state of solid matter generated by the reaction of NOx in the exhaust gas with ammonia is caught by its deposition on the wall 26a of the catalyst support 26 in the selective reduction catalyst, so that emission of the NOx into the atmosphere as it is can be effectively prevented even if the exhaust gas temperature is relatively low.

An invention according to claim 3 is a method for regenerating a selective reduction catalyst 24 described in claim 1, provided at the exhaust gas 16 of the diesel engine 11 and on which ammonium nitrate is deposited in the particle-state of solid matter.

The characteristic lies in that the temperature of the diesel particulate filter 51 provided at the exhaust pipe 16 on the exhaust-gas upstream side of the selective reduction catalyst 24 is raised so as to burn the particulates deposited on the diesel particulate filter 51, the temperature of the exhaust gas passing through the diesel particulate filter 51 is raised by burning the particulates, and ammonium nitrate deposited in the particle-state of solid matter deposited on the selective reduction catalyst 24 is burned and dissolved by heat of the exhaust gas whose temperature has been raised.

If ammonium nitrate is deposited in the particle-state of solid matter on the selective reduction catalyst 24, it might interfere with NOx purification action by clogging a fine hole in the wall 26a or covering the surface of the wall 26a. Also, if the amount of the particulates caught by the diesel particulate filter 51 is increased, flow passage resistance of the exhaust passing through the particulate filter 51 is increased. Therefore, the selective reduction catalyst 24 and the diesel particulate filter 51 needs to be regularly regenerated. The regenerating method described in claim 3 allows regeneration of the particulate filter 51 by raising the temperature of the particulate filter 51 so as to burn the particulates as well as regeneration of the particulate filter 51, and the selective reduction catalyst 24 can be also regenerated at the same time. Thus, a regenerating device for independently regenerating the selective reduction catalyst 24 is not needed any more, and the structure can be made relatively simple.

In the selective reduction catalyst of the present invention, the inlet portion and the outlet portion, adjacent to each other, of the plurality of through holes partitioned by the walls, are sealed alternately, the exhaust gas flowing in the inlet portion of a through hole passes through the wall and is emitted from the outlet portion of another through hole adjacent to the through hole, and the wall carrying the active component is configured so as not to pass ammonium nitrate in the particle-state of solid matter. Therefore, when the temperature of the exhaust gas is relatively low, NOx in the exhaust gas is changed into ammonium nitrate, which is a solid matter, and is caught by depositing it on the wall of the catalyst support. Thus, emission of NOx into the atmosphere as it is effectively prevented even if the exhaust gas temperature is relatively low.

In the engine exhaust gas purifier comprising the selective reduction catalyst, the liquid injection nozzle which is provided at the exhaust pipe on the exhaust-gas upstream side of the selective reduction catalyst and can inject urea liquid toward the selective reduction catalyst, the diesel particulate filter provided at the exhaust pipe on the exhaust-gas upstream side of the selective reduction catalyst, and the filter temperature raising means configured capable of raising the temperature of the diesel particulate filter to a predetermined value or above, the particulates in the exhaust gas of the diesel engine can be caught by the particulate filter, and emission of the particulate to the outside can be effectively prevented. Also, when urea liquid is injected from the liquid injection nozzle, the urea liquid is hydrolyzed and ammonia is generated, and when the exhaust gas temperature is relatively high, ammonia serves as a reducing agent for purifying NOx in the exhaust gas by the selective reduction catalyst, so that the amount of NOx emitted into the atmosphere can be reduced. On the other hand, when the exhaust gas temperature is relatively low, ammonium nitrate generated by the reaction of NOx in the exhaust gas with ammonia is caught by depositing it on the wall of the catalyst support in the selective reduction catalyst so that emission of the NOx into the atmosphere as it is can be effectively prevented even if the exhaust gas temperature is relatively low.

The selective reduction catalyst in which ammonium nitrate is deposited in the particle-state of solid matter needs to be regularly regenerated, but if the particulates deposited on the diesel particulate filter is burned by raising the temperature of the diesel particulate filter provided at the exhaust pipe on the exhaust-gas upstream side of the selective reduction catalyst so as to raise the temperature of the exhaust gas passing through the diesel particulate filter by burning the particulates and to burn and dissolve ammonium nitrate in the particle-state solid matter deposited on the selective reduction catalyst by heat of the exhaust gas whose temperature has been raised, the particulate filter can be regenerated and the selective reduction catalyst can be also regenerated at the same time. Thus, a regenerating device or the like for independently regenerating the selective reduction catalyst is not needed any more, and the structure can be made relatively simple.

DETAILED DESCRIPTION OF PREFERRED EMBODIMENTS

A preferred embodiment for carrying out the present invention will be described based on the attached drawings.

Figure 1:
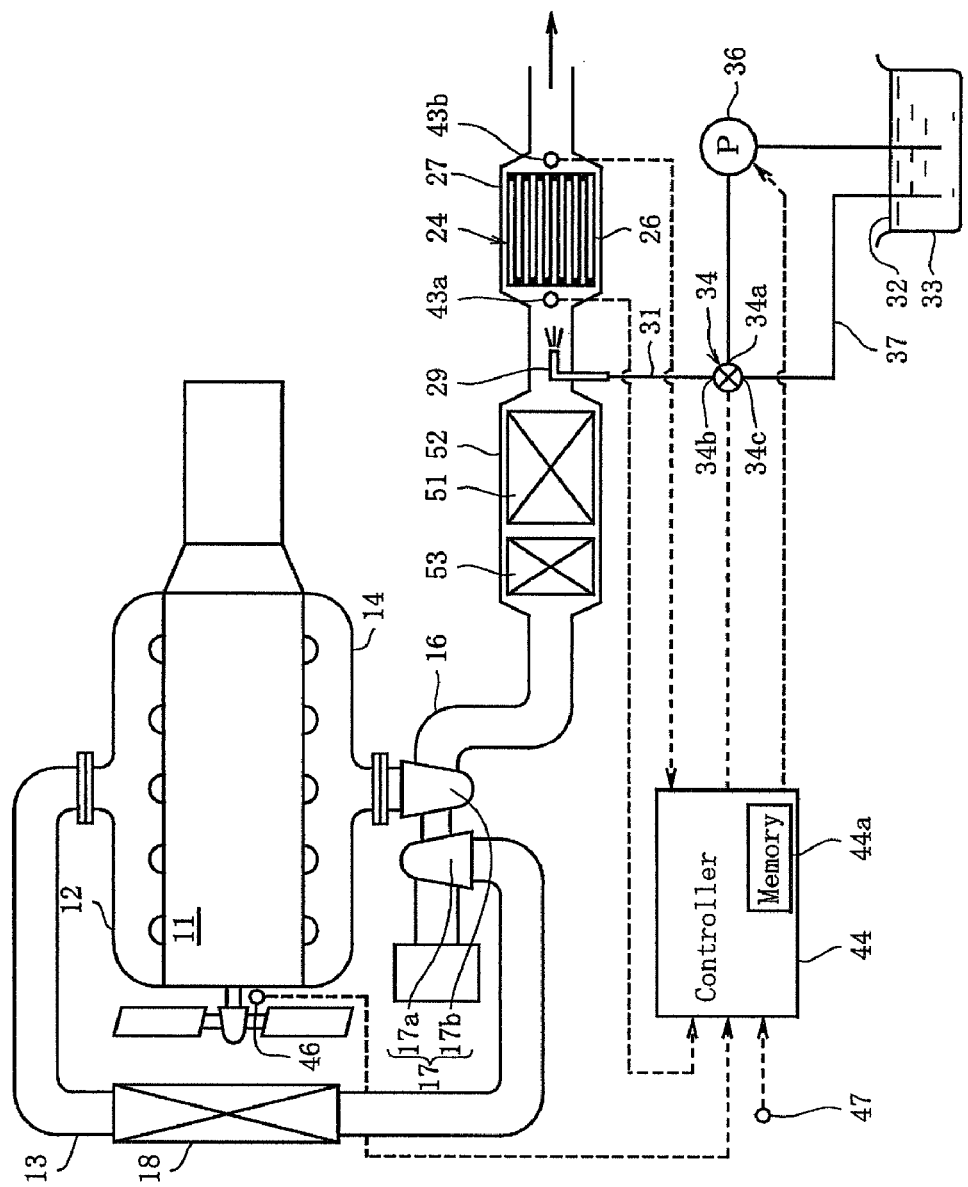
FIG. 1 is a block diagram illustrating configuration of an exhaust gas purifier of an embodiment of the present invention.

As shown in FIG. 1, an intake pipe 13 is connected to an intake port of a diesel engine 11 through an intake manifold 12, while an exhaust pipe 16 is connected to an exhaust port through an exhaust manifold 14. At the intake pipe 13, a compressor 17a of a turbocharger 17 and an intercooler 18 for cooling an intake air compressed by the turbocharger 17 are provided, respectively, and a turbine 17b of the turbocharger 17 is provided at the exhaust pipe 16. Though not shown, a rotor blade of the compressor 17a and a rotor blade of the turbine 17b are connected by a shaft. It is configured so that the turbine 17b is rotated by energy of an exhaust gas emitted from the engine 11 and the compressor 17a through the shaft, and an intake air in the intake pipe 13 is compressed by rotation of the compressor 17a.

Though not shown, a fuel injection device is provided at the engine 11. The fuel injection device in this embodiment has an in-cylinder injector which has its tip end portion faced to a cylinder and can inject diesel oil, which is a fuel, a common rail for accumulating the diesel oil inside and feeding the diesel oil to the injector, and a feed pump for supplying the diesel oil to this common rail. The in-cylinder injector is configured so that an injection amount and injection timing of the diesel oil can be adjusted by an electromagnetic valve built in the injector. This fuel injection device is configured so as to perform a post-injection that the diesel oil is injected into the cylinder after the piston has come to the top dead center and so as to increase or decrease hydrocarbon to be supplied to the exhaust pipe 16 from the engine depending on whether or not the post-injection is carried out. The selective reduction catalyst 24 is stored in a cylindrical converter 27 where the diameter of the exhaust pipe 16 is expanded.

Figure 2:
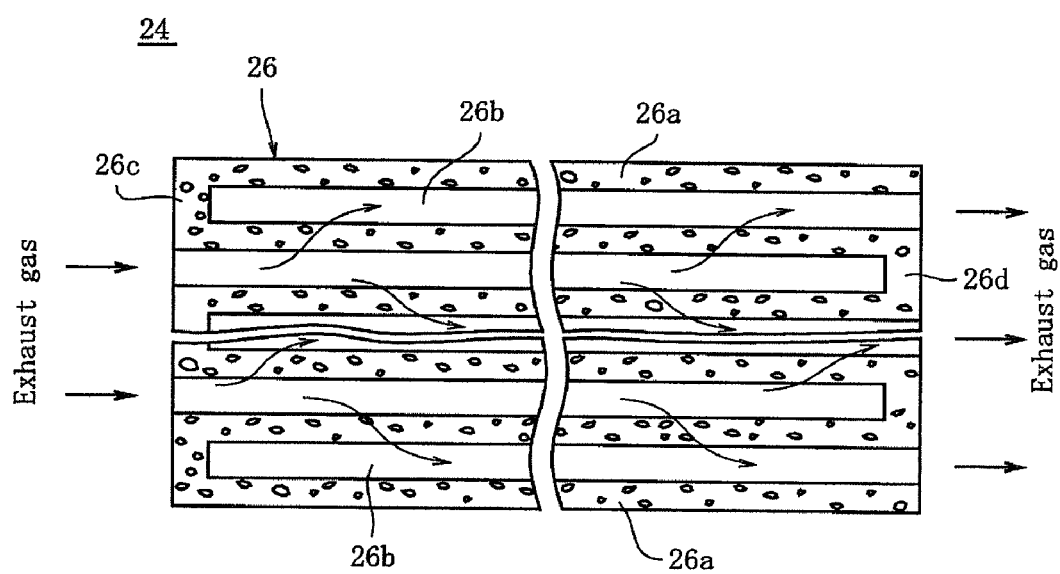
FIG. 2 is an enlarged sectional view of the selective reduction catalyst.

As shown in FIG. 2 in detail, the selective reduction catalyst 24 comprises a catalyst support 26 and an active component, not shown, having a catalytic action and carried by this catalyst support 26. The catalyst support 26 comprises a porous body made of a ceramic such as cordierite, silicon carbide or the like, and a plurality of through holes 26b partitioned by walls 26a are formed in parallel with each other. In this catalyst support 26, inlet portions 26c and outlet portions 26d, adjacent to each other, of the plurality of through holes 26a partitioned by the walls 26a are sealed alternately, and the walls 26a of the porous body are coated with an active component such as zeolite, alumina or the like, so that the catalyst support 26 is carried by the walls 26a. That is, the selective reduction catalyst 24 is made by dipping the catalyst support 26 in a liquid obtained by slurrying metal/zeolite or metal/alumina and then, removing the liquid and drying/sintering it so as to have the active component carried by the catalyst support 26. And the wall 26a is configured so as to have ventilation in the state where the active component is carried, and an exhaust gas flowing in the inlet portion 26c of a through hole 26b passes through the wall 26a as indicated by solid line arrows, flows into another through hole 26b adjacent to the through hole 26b, and is emitted from the output portion 26d of another through hole 26b adjacent to the through hole 26b. And the active component carried by the wall 26a is configured such that NOx in the exhaust gas from the engine 11 is dissolved by the reaction with the urea liquid. As an active component in this embodiment, for example, zeolite, alumina or the like is employed that reduces NOx in the exhaust gas flowing into the exhaust pipe 16 at a relatively low temperature between 200 and 300° C.

Returning to FIG. 1, at the exhaust pipe 16 on the exhaust-gas upstream side of the selective reduction catalyst 24, that is, at the inlet of the selective reduction catalyst 24, the liquid injection nozzle 29 is provided toward the selective reduction catalyst 24. One end of a liquid supply pipe 31 is connected to the liquid injection nozzle 29, and the other end of the liquid supply pipe 31 is connected to a liquid tank 33 in which the urea liquid 32 is reserved. Also, a liquid regulating valve 34 for regulating a supply amount of the liquid 32 to the liquid injection nozzle 29 is provided at the liquid supply pipe 31, and a pump 36 which can supply the liquid 32 in the liquid tank 33 into the liquid injection nozzle 29 is provided at the liquid supply pipe 31 between the liquid regulating valve 34 and the liquid tank 33. The liquid regulating valve 34 is a three-way valve having a first to a third ports 34a to 34c, in which the first port 34a is connected to a discharge port of the pump 36, the second port 34b is connected to the liquid injection nozzle 29, and the third port 34c is connected to the liquid tank 33 through a return pipe 37. And when the liquid regulating valve 34 is turned on, the first and the second ports 34a, 34b are made to communicate with each other, while when it is turned off, the first and the third ports 34a, 34c are made to communicate with each other.

On the other hand, a first and a second temperature sensors 43a, 43b for detecting an exhaust gas temperature in the exhaust pipe 16 is provided at the exhaust pipe 16. That is, at the inlet of the selective reduction catalyst 24 between the liquid injection nozzle 29 and the selective reduction catalyst 24, the first temperature sensor 43a for detecting the exhaust gas temperature in the exhaust pipe 16 at the inlet is provided. On the other hand, at the outlet of the selective reduction type catalyst 24, the second temperature sensor 43b for detecting the exhaust gas temperature in the exhaust pipe 16 at the outlet is provided. Detection outputs of the first and the second temperature sensors 43a, 43b are connected to control inputs of a controller 44 made of a microcomputer, respectively. To the other control inputs of the controller 44, each of detection outputs such as a rotation sensor 46 for detecting a rotation speed of the engine 11, a load sensor 47 for detecting a load of the engine 11 and the like is connected. The load sensor 47 detects a displacement amount of a load lever of the fuel injection pump (not shown) in this embodiment. The control output of the controller 44 is connected to the liquid regulating valve 34 and the pump 36, respectively. The controller 44 is provided with a memory 44a. The memory 44a stores in advance the exhaust gas temperature at the inlet and the outlet of the selective reduction catalyst 24, ON/OFF of the liquid regulating valve 34 according to the engine rotation, engine load and the like, an opening degree at the time the valve is ON, and presence or absence of operation of the pump 36.

Also, a diesel particulate filter 51 made of a porous ceramic is provided at the exhaust pipe 16 on the exhaust-gas upstream side of the selective reduction catalyst 24, and an oxidation catalyst 53 is further provided on the upstream side of the filter 51. The diesel particulate filter 51 and the oxidation catalyst 53 are stored side by side in the cylindrical converter 52 where the diameter of the exhaust pipe 16 on the upstream side of the selective reduction catalyst 24 is expanded. Though not shown, the particulate filter 51 is honeycomb-shaped in which a first passage plugged at the upstream side and a second passage plugged at the downstream side are arranged alternately and is configured so that the exhaust gas passes from the second passage through the flow passage wall surface of porous ceramic and flows to the downstream side through the first passage. The particulates in the exhaust gas are caught by the porous ceramic and emission of the particulates into the atmosphere is prevented. On the other hand, the oxidation catalyst 53 has a monolith catalyst support (material: cordierite), not shown, in which passages are formed in a lattice-shaped structure (honeycomb-shaped structure) in the direction where the exhaust gas is flowing, and the monolith catalyst support is coated with platinum-zeolite catalyst or platinum-alumina catalyst. This coating provides oxidation power of soot or hydrocarbon (HC or the like) for the oxidation catalyst 53.

There is provided a filter temperature raising means configured capable of raising the temperature of the diesel particulate filter 51 to a predetermined value. The filter temperature raising means in this embodiment comprises the above-mentioned oxidation catalyst 53 and the fuel injection device, not shown. That is, post-injection of the diesel oil by the fuel injection device into the cylinder allows hydrocarbon to be increased in the exhaust gas and to be supplied together with the exhaust gas from the engine 11 to the exhaust pipe 16. When hydrocarbon is increased in the exhaust gas, the increased hydrocarbon is oxidized/reacted in the oxidation catalyst 53, which increases the temperature of the exhaust gas itself. Thus, the temperature of the diesel particulate filter 51 located on the downstream side is raised to the predetermined value.

Action of the engine exhaust gas purifier constructed as above will be described below.

When the engine 11 is started, the exhaust gas travels from the exhaust manifold 14 to the exhaust pipe 16 and reaches the diesel particulate filter 51 through the exhaust pipe 16. The particulates in the exhaust gas from the diesel engine 11 are caught by the diesel particulate filter 51. And the exhaust gas in which the particulates are caught and removed passes through the particulate filter 51 and reaches the selective reduction catalyst 24 located on the downstream side. And NOx in the exhaust gas is purified at the selective reduction catalyst 24.

That is, the controller 44 which has determined that the temperature of the exhaust gas is relatively high from the detection outputs of the first and the second temperature sensors 43a, 43b, turns on the liquid regulating valve 34 so as to make the first and the second ports 34a, 34b at the liquid regulating valve 34 communicate with each other and injects the urea liquid 32 from the liquid injection nozzle 29. This is because a reducing agent is needed to purify NOx in the exhaust gas by the selective reduction catalyst 24, and the urea liquid 32 adjusted to a predetermined concentration in advance is reserved in the liquid tank 33. The controller 44 estimates the NOx concentration in the exhaust gas from the driving state of the diesel engine 11 obtained based on each detection output of the rotation sensor 46 and the load sensor 47 and obtains an amount of urea as a reducing agent required for purifying this NOx. Also, the controller 44 determines a specific injection amount of the urea liquid 32 from the obtained urea amount required for the reducing agent, turns on the liquid regulating valve 34 and injects the optimal amount of the urea liquid 32 from the injection nozzle 29. The injected urea liquid is heated by the exhaust gas and hydrolyzed, so that ammonia is generated. When this ammonia flows into the selective reduction catalyst 24, NO, $NO_2$ in the exhaust gas is reduced and changed into $N_2$ or $H_2O$, and the amount of NOx emitted as it is into the atmosphere is reduced.

If the temperature of the exhaust gas is relatively low, it is known that NOx reacts with ammonia supplied as a reducing agent and thereby ammonium nitrate is generated. This ammonium nitrate turns into a solid matter at a low temperature below the melting point of 210° C., and cannot pass through the wall 26a of the catalyst support at the selective reduction catalyst 24, but is deposited on the wall 26a. The selective reduction catalyst 24 catches ammonium nitrate generated by the reaction of NOx with ammonia by depositing it on the wall and effectively prevents NOx from being emitted into the atmosphere as it is even when the exhaust gas temperature is relatively low. Therefore, the controller 44 which determines from the detection outputs of the first and the second temperature sensors 43a, 43b that the exhaust gas temperature is relatively low turns on the liquid regulating valve 34 as necessary so as to make the first and the second ports 34a, 34b at the liquid regulating valve 34 communicate and injects the urea liquid 32 from the liquid injection nozzle 29. The controller 44 obtains an amount of urea required for changing NOx in the exhaust gas into ammonium nitrate from the driving state of the diesel engine 11 obtained based on each of the detection outputs of the rotation sensor 46 and the load sensor 47. And the controller 44 turns on the liquid regulating valve 34 based on the required urea amount, so that the optimal amount of the urea liquid 32 is injected from the injection nozzle 29 and Nox is caught by changing it into ammonium nitrate and depositing it on the wall 26a of the catalyst 24. Thus, the emission of NOx is reduced even when the exhaust gas temperature is relatively low.

On the other hand, if ammonium nitrate, which is a particle-state solid matter, excessively is deposited on the selective reduction catalyst 24, there may occur a problem that fine holes in the wall 26a of the catalyst 24 are clogged or the surface of the wall 26a is covered, which interferes with NOx purification reaction. Also, even if the diesel particulate filter 51 is provided on the upstream side of the selective reduction catalyst 24, as the amount of particulates caught by the diesel particulate filter 51 is increased, flow passage resistance of the exhaust passing through the particulate filter 51 is also increased. Thus, the selective reduction catalyst 24 and the diesel particulate filter 51 provided on the upstream side need to be regularly regenerated. The regenerating method will be described below.

Regeneration of the selective reduction catalyst 24 is carried out together with regeneration of the particulate filter 51. And the regeneration of the particulate filter 51 is carried out by post-injection into the cylinder of the diesel oil, which is a fuel, with the fuel injection device, not shown, which is a filter temperature raising means. This post-injection allows hydrocarbon in the exhaust gas to be increased and supplied together with the exhaust gas from the engine 11 to the exhaust pipe 16. If hydrocarbon is increased in the exhaust gas, the increased hydrocarbon is oxidized/reacted in the oxidation catalyst 53 so as to raise the temperature of the exhaust gas itself and also to raise the temperature of the diesel particulate filter 51 located on the downstream side. When the temperature of the particulate filter 51 is raised and the temperature of the particulates exceeds a temperature at which the particulates can be burned, for example, 600° C., the particulates caught by the particulate filter 51 is burned by the heat, so that the particulate filter 51 is regenerated.

When the temperature of the particulate filter 51 is raised and the particulates are burned, the temperature of the exhaust gas having passed through the particulate filter 51 is extremely raised, and the exhaust gas whose temperature has been raised reaches the selective reduction catalyst 24 provided on the downstream side. On the other hand, ammonium nitrate deposited on the selective reduction catalyst 24 is burned at 210° C. or above, and ammonium nitrate, which is a particle-state solid matter, deposited on the selective reduction catalyst 24 is burned and dissolved by the heat of the exhaust gas whose temperature has been raised, so that the selective reduction catalyst 24 can be regenerated.

In the above-mentioned embodiment, a diesel engine with a turbocharger is exemplified as an engine, but the exhaust gas purifier of the present invention may be used in a natural aspirated diesel engine.

Also, in the above-mentioned embodiment, a fuel injection device capable of post-injection is described as a filter temperature raising means, but the filter temperature raising means may be anything that can raise the temperature of the filter by raising the exhaust gas temperature. For example, a means may be used which increases an engine load by closing an EGR control valve, an intake throttle valve or an exhaust brake valve or by increasing a nozzle-vane opening degree of a variable geometry (VG) turbo, or which has a nozzle capable of injecting hydrocarbon directly toward the filter immediately before the filter.

What is claimed is:

1. An engine exhaust gas purifier comprising:
   a selective reduction catalyst, provided at an exhaust pipe of the diesel engine;
   a liquid injection nozzle which is provided at the exhaust pipe on the exhaust-gas upstream side of the selective reduction catalyst and can inject urea liquid toward the selective reduction catalyst;
   a diesel particulate filter provided at the exhaust pipe on the exhaust-gas upstream side of the selective reduction catalyst; and
   filter temperature raising means configured capable of raising the temperature of the diesel particulate filter to a temperature of 600° C. or above,
   wherein the selective reduction catalyst comprises a catalyst support in which a plurality of through holes are formed and partitioned by porous walls parallel to each other, the parallel porous walls carrying an active component having a catalytic action, in which nitrogen oxide in an exhaust gas from an engine is reacted with urea liquid for dissolution, wherein
   the active component is zeolite;
   an inlet and an outlet, adjacent to each other, of the plurality of through holes partitioned by the parallel porous walls are sealed alternately;
   the parallel porous walls carrying the active component have ventilation for the exhaust gas including dissolved gas of nitrogen oxide and are formed so that the exhaust gas flowing in the inlet of a first through hole passes through the porous walls and is emitted from the outlet of another through hole adjacent to the first through hole;
   the parallel porous walls carrying the active component are formed so that ammonium nitrate in the particle-state of solid matter cannot pass through the parallel porous walls; and
   the ammonium nitrate deposited on the parallel porous walls is configured so as to be dissolved and pass through the parallel porous walls by heat of the exhaust gas the temperature of which has been raised to a temperature of 600° C. or above by said filter temperature raising means, so that the reduction catalyst can be regenerated.

* * * * *